(12) United States Patent
Usami et al.

(10) Patent No.: US 10,397,982 B2
(45) Date of Patent: Aug. 27, 2019

(54) PHOTOGRAPHING DEVICE FOR VEHICLE

(71) Applicant: TOYOTA JIDOSHA KABUSHIKI KAISHA, Toyota-shi, Aichi-ken (JP)

(72) Inventors: Masayuki Usami, Toyota (JP);
Kunihiko Toyofuku, Toyota (JP);
Ryuichi Shinkai, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 15/464,824

(22) Filed: Mar. 21, 2017

(65) Prior Publication Data
US 2017/0295610 A1 Oct. 12, 2017

(30) Foreign Application Priority Data

Apr. 6, 2016 (JP) ................. 2016-076275

(51) Int. Cl.
*H05B 3/06* (2006.01)
*H05B 3/20* (2006.01)
(Continued)

(52) U.S. Cl.
CPC ............... *H05B 3/06* (2013.01); *B60R 11/04* (2013.01); *B60S 1/0848* (2013.01); *B60S 1/56* (2013.01);
(Continued)

(58) Field of Classification Search
CPC ... B60R 11/04; B60R 2011/0026; B60R 1/00; B60R 1/002; B60R 2001/1253; B60R 2011/0033; B60R 2300/8053; B60R 2300/8093; H05B 3/84; H05B 2203/013; H05B 3/86; H05B 1/02; H05B 1/0236; H05B 2203/016; H05B 2203/02;
(Continued)

(56) References Cited

U.S. PATENT DOCUMENTS 4,539,466 A * 9/1985 Yamamoto ............ B60S 1/026
219/203
9,395,538 B2 * 7/2016 Hui ...................... H04N 5/2251
(Continued)

FOREIGN PATENT DOCUMENTS

JP S50-059819 U 6/1975
JP S55-110359 U 8/1980
(Continued)

*Primary Examiner* — Nathnael Aynalem
(74) *Attorney, Agent, or Firm* — Oliff PLC

(57) ABSTRACT

A photographing device for a vehicle includes: an imaging element configured to receive a photographing beam passing through a beam transmission section of a window section; a heater constituted by a heating wire; a section to be heated to which the heater is fixed, the section to be heated being opposite to an inner side surface of the beam transmission section; a switch element configured to switch electrical connection state to the heater; and a current limiting element disposed at the section to be heated and being configured such that current flowing through the heater becomes zero or is reduced when the electric circuit is short-circuited such that power is supplied to the heater while bypassing the switch element and a temperature of the current limiting element become equal to or higher than a predetermined value.

5 Claims, 10 Drawing Sheets

(51) Int. Cl.
*B60R 11/04* (2006.01)
*G02B 27/00* (2006.01)
*H04N 7/18* (2006.01)
*B60S 1/08* (2006.01)
*B60S 1/56* (2006.01)
*H05B 1/02* (2006.01)
*H05B 3/84* (2006.01)
*B60R 11/00* (2006.01)
*G06K 9/00* (2006.01)

(52) U.S. Cl.
CPC ........... *H04N 7/183* (2013.01); *H05B 1/0236* (2013.01); *H05B 3/20* (2013.01); *H05B 3/84* (2013.01); *B60R 2011/0026* (2013.01); *B60R 2011/0063* (2013.01); *G02B 27/0006* (2013.01); *G06K 9/00805* (2013.01); *H05B 2203/003* (2013.01); *H05B 2203/013* (2013.01)

(58) Field of Classification Search
CPC .......... H05B 2203/031; H05B 2214/02; H05B 3/145; B60S 1/04; B60S 1/0844; B60S 1/3803; B60J 1/002; B60Q 1/20; B64D 15/12
USPC .................. 219/202, 203, 448.19, 522, 538; 348/148; 359/512, 838
See application file for complete search history.

(56) References Cited

U.S. PATENT DOCUMENTS

| | | | |
|---|---|---|---|
| 9,635,229 B2* | 4/2017 | Wato | H04N 5/2252 |
| 9,961,240 B2* | 5/2018 | Wato | H04N 5/2251 |
| 2004/0032668 A1* | 2/2004 | Schaefer | B60R 11/04 |
| | | | 359/642 |
| 2010/0219173 A1* | 9/2010 | Gruber | B06S 1/0848 |
| | | | 219/203 |
| 2015/0034621 A1 | 2/2015 | Timmermann et al. | |
| 2015/0042804 A1* | 2/2015 | Okuda | B60R 11/04 |
| | | | 348/148 |
| 2016/0091714 A1 | 3/2016 | Hui et al. | |
| 2017/0006664 A1* | 1/2017 | Lim | H05B 3/03 |
| 2017/0070652 A1* | 3/2017 | Muller | B60R 11/04 |
| 2017/0367150 A1* | 12/2017 | Nagae | H05B 1/02 |

FOREIGN PATENT DOCUMENTS

| | | |
|---|---|---|
| JP | S63-146376 A | 6/1988 |
| JP | H03-015884 A | 1/1991 |
| JP | H11-094276 A | 4/1999 |
| JP | H11-141900 A | 5/1999 |
| JP | 2005-024190 A | 1/2005 |
| JP | 2014-101004 A | 6/2014 |
| JP | 2015-509458 A | 3/2015 |
| KR | 10-1994-0014047 A | 7/1994 |
| KR | 101593983 B1 | 2/2016 |

* cited by examiner

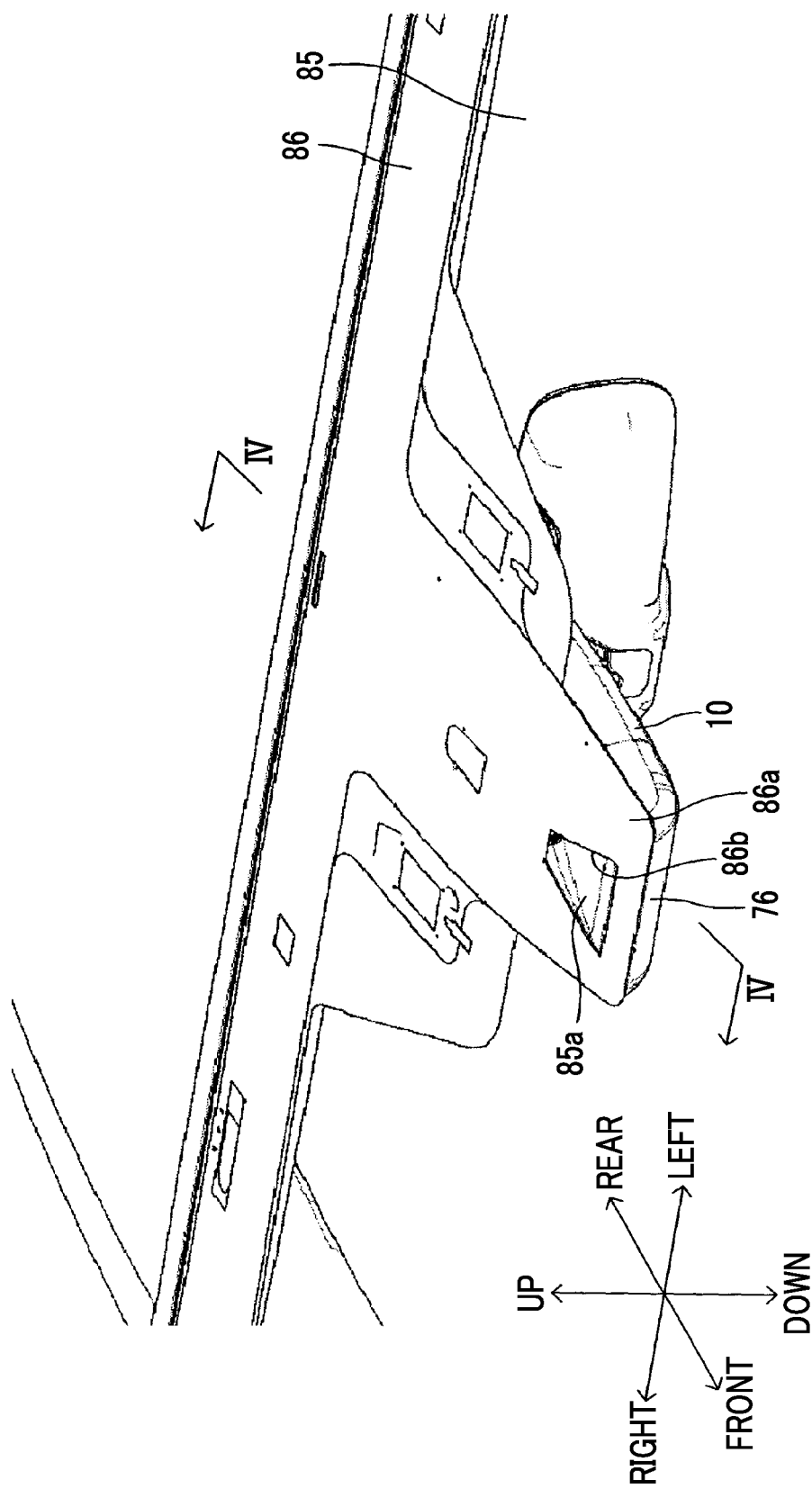

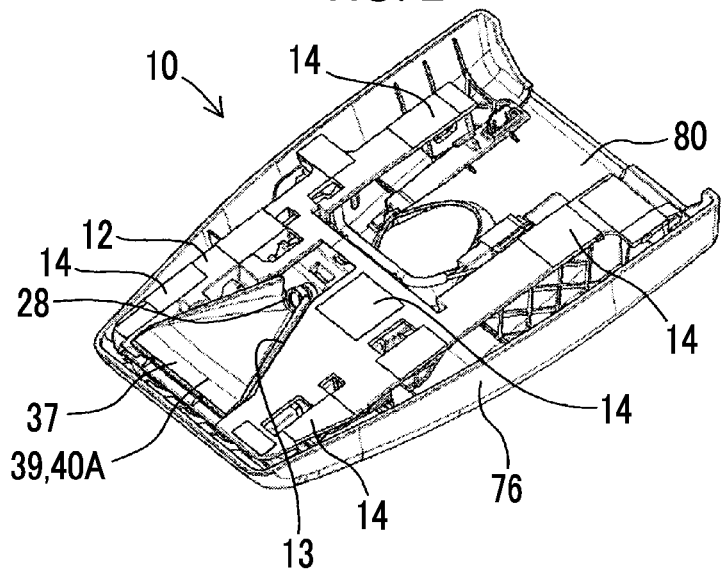
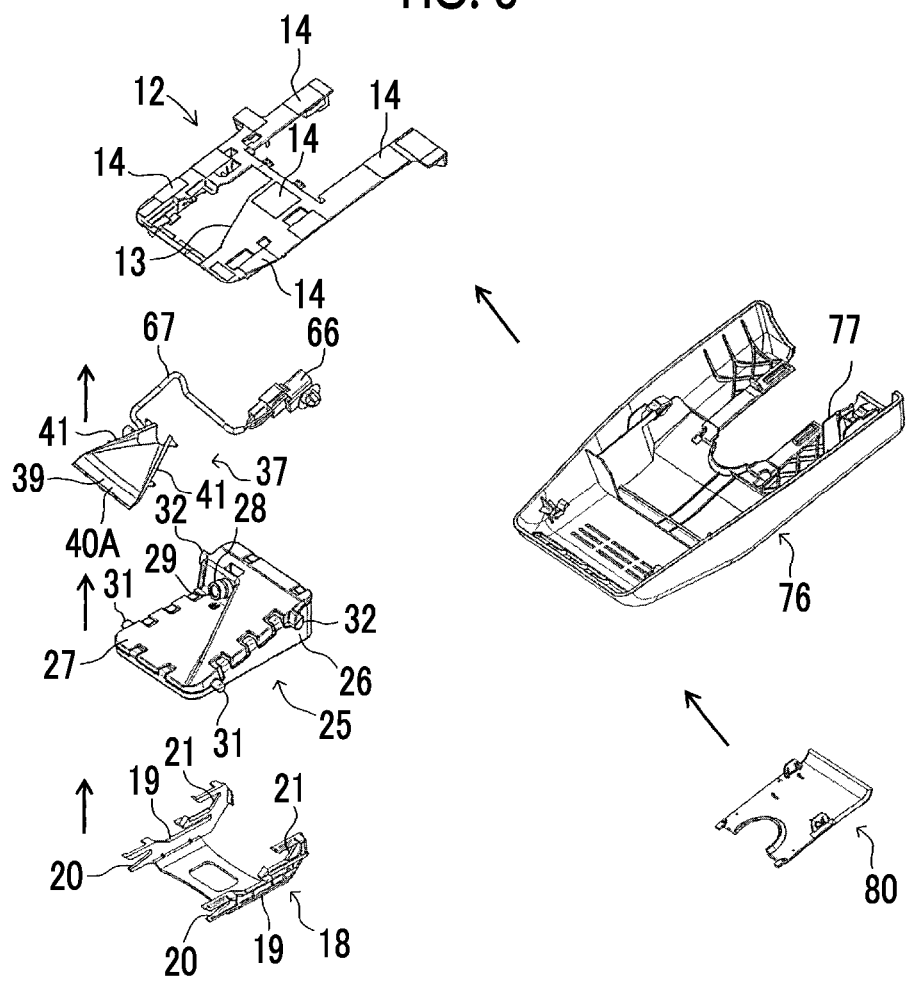

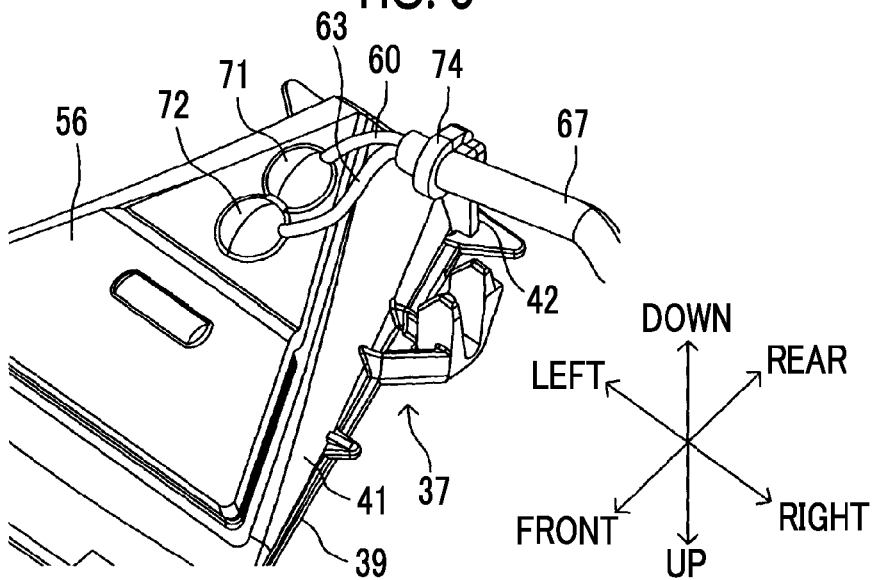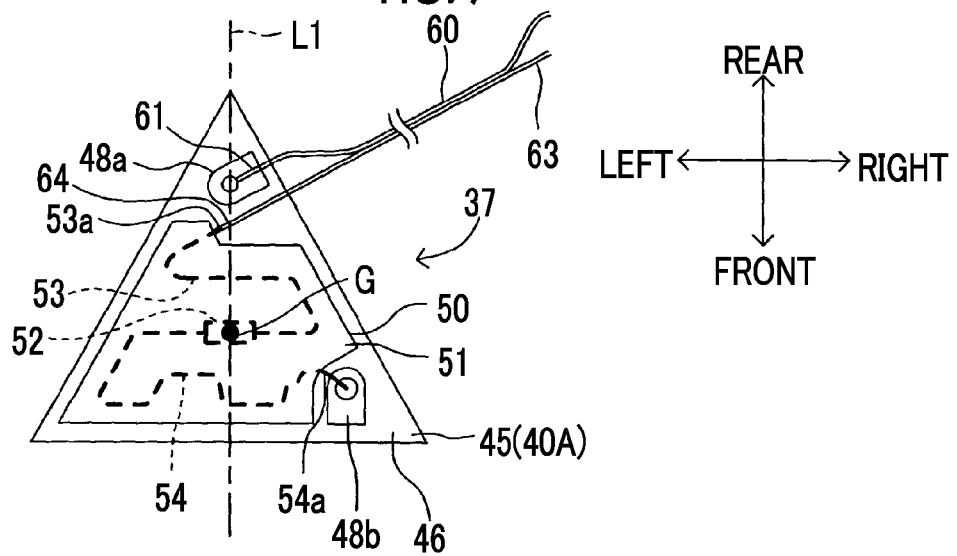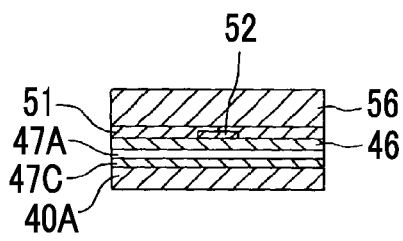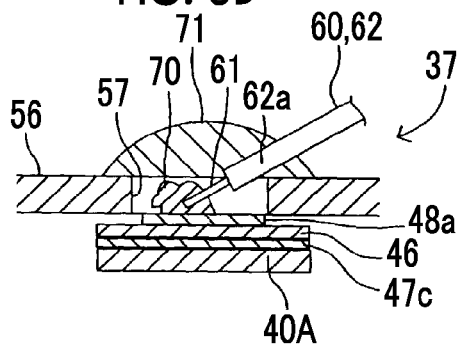

PHOTOGRAPHING DEVICE FOR VEHICLE

INCORPORATION BY REFERENCE

The disclosure of Japanese Patent Application No. 2016-076275 filed on Apr. 6, 2016 including the specification, drawings and abstract is incorporated herein by reference in its entirety.

BACKGROUND

1. Technical Field

The present disclosure relates to a photographing device for a vehicle.

2. Description of Related Art

A photographing device may be installed on a front window of a vehicle on the surface inside the vehicle. For example, such a photographing device is used as a portion of a pre-crash safety system (hereinafter referred to as "PCS").

This type of a photographing device includes a bracket fixed to the inner surface (the rear surface) of the front window, and a camera unit supported by the bracket. The camera unit includes a lens and an imaging element disposed immediately behind the lens.

For example, when another vehicle (hereinafter referred to as "a forward vehicle") is disposed in front of the vehicle on which the PCS is mounted, reflected beams reflected by the forward vehicle are received by an imaging element after passing through a beam transmission section serving as a portion of the front window, a gap between the beam transmission section and the bracket, and the lens. The imaging element converts the reflected beams (a subject image) into imaging data (an electrical signal), and transmits the imaging data to a control device of the vehicle.

Then, the control device determines whether the imaged subject is an obstacle or not based on the received imaging data, and calculates a distance from the vehicle to the obstacle. When the control device determines that the imaged subject is an obstacle and the distance from the vehicle to the obstacle is smaller than a preset predetermined distance, the control device operates a brake apparatus of the vehicle.

Incidentally, using an air heating in the vehicle when an outdoor air temperature of the vehicle is low may generate dewing on the beam transmission section of the front window. In addition, when the outdoor air temperature is low, ice or frost may adhere to the vehicle outer surface of the beam transmission section. When such a phenomenon occurs in the beam transmission section, the imaging element may image an unclear subject image or may be unable to image an obstacle. For this reason, in this case, the control device may be unable to perform determination of whether the imaged subject is an obstacle and calculation of the distance from the vehicle to the obstacle.

For this reason, in a vehicle of Japanese Patent Application Publication No. 2014-101004 (JP 2014-101004 A), a heater constituted by a heating wire is embedded in a beam transmission section of a front window. An electric circuit to which the heater is connected is connected to a power supply of the vehicle, and the heater generates heat when power of the power supply is supplied to the electric circuit. For this reason, even when dewing occurs on the beam transmission section of the front window or ice or frost is attached to a vehicle outer surface of the beam transmission section, dew, frost, ice, and so on, on the beam transmission section are eliminated by heating the beam transmission section by using the heater. Accordingly, when the beam transmission section is heated by the heater, the probability of the imaging element imaging an unclear subject image or being unable to image the obstacle can be reduced.

When power is continuously supplied to the heater (the heating wire) for a long time, the heater may be excessively heated to a high temperature and the high temperature state may continue for a long time. As a result, since the imaging element is heated for a long time by radiant heat from the heated beam transmission section, the imaging element may be unable to exhibit desired performance. That is, the imaging element may image an unclear subject image or may be unable to image the obstacle.

In order to solve the above-mentioned problems, in JP 2014-101004 A, power from the power supply is repeatedly supplied to the heater at predetermined time intervals. That is, power supply to the heater is controlled such that the excessively high temperature state of the heater does not maintain for a long time. For example, when the switch element configured to repeatedly switch ON and OFF at predetermined time intervals is installed at the electric circuit to which the heater is connected, the power can be repeatedly supplied from the power supply to the heater at predetermined time intervals.

However, if a short circuit occurs in the electric circuit and the power from the power supply is directly supplied to the heater without going through the switch element, the heater continues heating for a long time. As a result, the excessively high temperature state of the heater can maintain for a long time.

SUMMARY

The present disclosure provides a photographing device for a vehicle capable of reducing the probability of a heater constituted by a heating wire and configured to heat a window section maintaining an excessively high temperature state for a long time.

A photographing device for a vehicle, according to an aspect of the present disclosure includes: an imaging element disposed inward of a window section, the window section being formed of a transparent material and installed at the vehicle, the imaging element being configured to receive a photographing beam passing through a beam transmission section, and the beam transmission section being a portion of the window section; a heater constituted by a heating wire, the heater constituting a portion of an electric circuit connected to a power supply, and being configured to generate heat when power is supplied from the power supply; a section to be heated to which the heater is fixed, the section to be heated being opposite to an inner side surface of the beam transmission section, and the section to be heated being configured to receive the heat from the heater to apply radiant heat to the beam transmission section; a switch element constituting a portion of the electric circuit and configured to switch electrical connection state to the heater; and a current limiting element disposed at the section to be heated and constituting a portion of the electric circuit to be disposed between the heater and the switch element, the current limiting element being configured such that current flowing through the heater becomes zero or is reduced when the electric circuit is short-circuited such that power is supplied to the heater while bypassing the switch element and a temperature of the current limiting element become equal to or higher than a predetermined value.

When a short circuit occurs in the electric circuit in a condition in which power is supplied to the heater while bypassing the switch element and a large current continuously flows through the heater due to the short circuit, a temperature of the current limiting element is equal to or higher than a predetermined value. Then, the current limiting element causes the current flowing through the heater to be zero or to be reduced. When the current flowing through the heater becomes zero, the heater cannot maintain an excessively high temperature state. Similarly, when the current flowing through the heater is reduced, the heater cannot maintain the excessively high temperature state. Accordingly, the probability of the heater maintaining the excessively high temperature state for a long time can be reduced in this case.

In the above aspect, one surface of the section to be heated may be a plate-shaped body opposite to the beam transmission section, and the current limiting element may be disposed on a straight line extending in a plate thickness direction of the section to be heated through a center of gravity of the section to be heated.

In the specification, the term "center of gravity" means a geometric center.

When the heater is heated, the section to be heated is heated. However, because the section to be heated cannot be evenly heated as a whole, the center of gravity is most easily heated, and the temperature is easily lowered from the center of gravity toward a circumferential edge portion. For this reason, if the current limiting element is disposed on a straight line passing through the circumferential edge portion of the section to be heated and extending in a plate thickness direction of the section to be heated, for example, the current limiting element is not easily heated to a high temperature when a short circuit occurs in the electric circuit. However, when the present disclosure is configured in this way, for example, the current limiting element is easily heated to a high temperature when a short circuit occurs in the electric circuit. Accordingly, in this case, a temperature of the heater can be reliably lowered by the current limiting element.

In the above aspect, the current limiting element may be a fuse, a bi-metal or a PTC thermistor.

As a result, the photographing device for a vehicle can be manufactured at a low cost.

In the above aspect, the electric circuit may be a series electric circuit.

As a result, a structure of the electric circuit is simplified.

In the above aspect, one surface of the section to be heated may be a plate-shaped body opposite to the beam transmission section, and the photographing device may include a heater fixing section configured to fix the heater to the section to be heated, a double sided tape having a first surface to which the heater fixing section is adhered, and an heat insulating material adhered to a second surface of the double sided tape and having thermal conductivity lower than that of the heater fixing section and the section to be heated.

When the present disclosure is configured in this way, heat generated by the heater can be efficiently applied to the section to be heated.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 1 is a perspective view showing a photographing device for a vehicle and a front window according to an embodiment of the present disclosure from a forward side;

FIG. 2 is a perspective view showing the photographing device for a vehicle from above;

FIG. 3 is an exploded perspective view showing the photographing device for a vehicle from above;

FIG. 6 is a perspective view showing the shading heating unit (the first set) from below;

FIG. 7 is a schematic view showing a section to be heated, a heater module, a fuse module and a cable module from below;

FIG. 8A is a cross-sectional view showing the shading heating unit (the first set) cut at a position passing through a fuse;

FIG. 8B is a cross-sectional view showing the shading heating unit (the first set) cut at a position passing through a sealing material;

DETAILED DESCRIPTION OF EMBODIMENTS

Hereinafter, a photographing device for a vehicle according to an embodiment of the present disclosure will be described with reference to the accompanying drawings.

Figure 4:
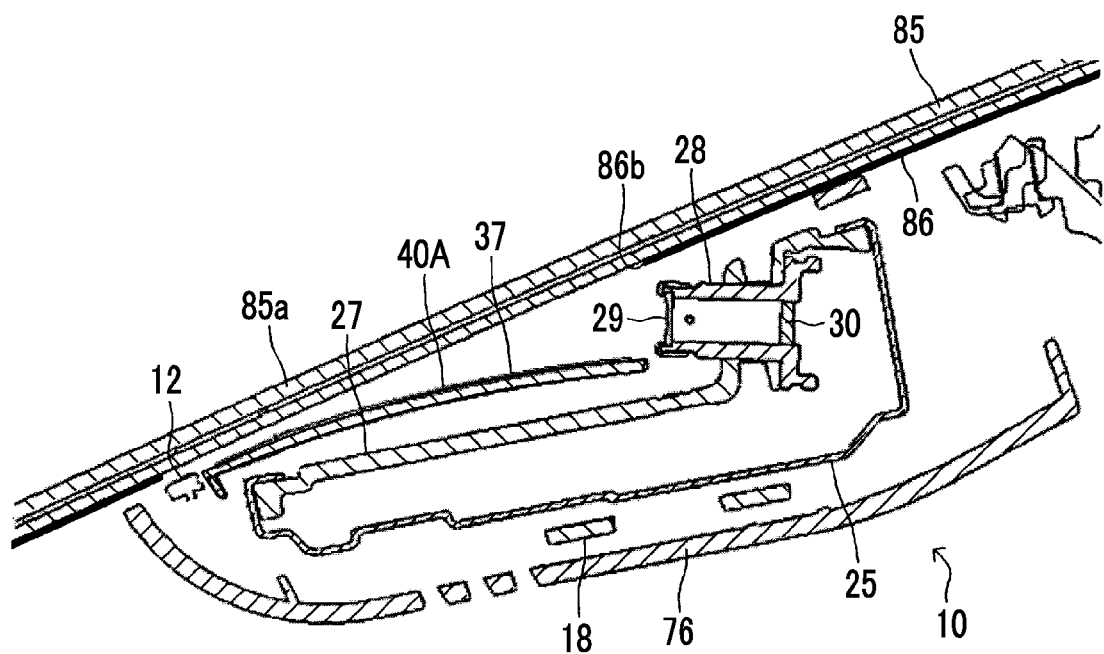
FIG. 4 is a cross-sectional view taken along line IV-IV of FIG. 1.

A vehicle includes a front window 85 shown in FIG. 1 and FIG. 4. The front window 85 is formed of a transparent material (for example, glass, a resin, or the like). As shown in FIG. 1 and FIG. 4, the front window 85 is inclined with respect to a vehicle body in a state in which the front window 85 is gradually directed forward from top to bottom.

As shown in FIG. 1, a shading sheet 86 formed in substantially a T shape as a whole is attached to an upper edge portion of a rear surface (i.e., the surface inside the vehicle) of the front window 85 and the vicinity thereof. A forward extension section 86a extending obliquely forward and downward is formed at a central portion of the shading sheet 86. A light transmission hole 86b having a substantially trapezoidal shape is formed in the vicinity of the front end of the forward extension section 86a. A portion of the front window 85 opposite to the light transmission hole 86b constitutes a beam transmission section 85a.

The vehicle includes brake apparatuses configured to apply braking forces to wheels, a brake actuator configured to operate the brake apparatuses, and a vehicle speed detection apparatus configured to detect a vehicle speed (none of which is shown). The brake actuator is linked to a brake pedal installed in the vehicle. When a driver depresses the brake pedal with her or his foot, the brake actuator is operated. Then, when the brake actuator operates the brake apparatuses, braking forces are applied to the corresponding wheels from the brake apparatuses.

Further, the vehicle includes an electrical control device (not shown; hereinafter referred to as "a control device") 100 connected to the brake actuator and the vehicle speed detection apparatus (see FIG. 9). "Approach determination data" is stored in a memory of the control device 100. The "approach determination data" is data displaying a distance at which the brake apparatuses or the like are to be operated when a distance between the vehicle during forward travel and an obstacle disposed in front of the vehicle is smaller than the displayed distance.

Further, the vehicle includes a temperature sensor 101 (see FIG. 9) configured to measure a temperature outside the vehicle. The temperature sensor 101 is connected to the control device 100.

As shown in FIG. 1 and FIG. 4, a photographing device 10 for a vehicle (hereinafter referred to as "the photographing device 10") is fixed to the surface of the front window 85 inside the vehicle in a manner opposing to the beam transmission section 85a. As shown in FIG. 2 to FIG. 4, the photographing device 10 includes a bracket 12, a camera support bracket 18, a camera unit 25, a shading heating unit 37 (or a shading heating unit 37' (to be described below)), a main cover 76 and a sub-cover 80 as main components.

The bracket 12 is a product integrally formed of a hard resin. A support section 13 having a substantially trapezoidal shape is formed in the bracket 12 as a through-hole. Further, a plurality of adhesive surfaces 14 are formed at an upper surface of the bracket 12.

The camera support bracket 18 is a product integrally formed of a hard resin. The camera support bracket 18 includes a pair of left and right camera support pieces 19. First support concave sections 20 are formed at front end surfaces of the left and right camera support pieces 19. Further, second support concave sections 21 are formed at rear sections of the left and right camera support pieces 19. The camera support bracket 18 can be attached to and detached from a lower surface of the bracket 12.

The camera unit 25 includes a housing 26 serving as a product integrally formed of a resin and constituting an exterior of the camera unit 25. As shown, a bottom surface and an upper surface of the housing 26 are not parallel to each other.

A hood mounting concave section 27 having a substantially trapezoidal shape when seen in a plan view is formed at the upper surface of the housing 26. An imaging unit 28 is fixed to a rear end surface of the hood mounting concave section 27. As shown in FIG. 4, the imaging unit 28 includes a lens 29 and an imaging element 30 disposed immediately behind the lens 29. The imaging element 30 is a compound eye type. The imaging element 30 receives a reflected beam (a photographing beam) of natural light reflected rearward by the obstacle disposed in front of the camera unit 25 and passing through the lens 29. A magnitude (a cross-sectional shape) of the reflected beam entering the imaging unit 28 is defined by an angle of view of the lens 29 of the imaging unit 28. The reflected beam (the cross-sectional shape) has a constant magnitude that does not interfere with a surface of a section to be heated 40A (40B) of the shading heating unit 37 (37'), which will be described below.

First supported shafts 31 disposed coaxially with each other and extending in a left-right direction respectively, protrude from the vicinity of front ends of both of left and right side surfaces of the housing 26. Further, second supported shafts 32 disposed behind the first supported shafts 31 protrude from both of the left and right side surfaces of the housing 26. The left and right second supported shafts 32 are disposed coaxially with each other and extend in the left-right direction. In a state in which the housing 26 is disposed immediately above a bottom section of the camera support bracket 18 and between the left and right camera support pieces 19, as the left and right first supported shafts 31 are engaged with the left and right first support concave sections 20 and the left and right second supported shafts 32 are engaged with the left and right second support concave sections 21, the camera unit 25 is supported by the camera support bracket 18.

The shading heating unit 37 shown in FIG. 3 to FIG. 8B includes a shading hood 39, a heater module 45, a double sided tape 47C, a fuse module 50, an heat insulating material 56, a cable module 59 and a tying band 74 as main components. The shading heating unit 37 shown in FIG. 3 to FIG. 8B may be referred to as "a first set 37" in the specification.

Figure 5:
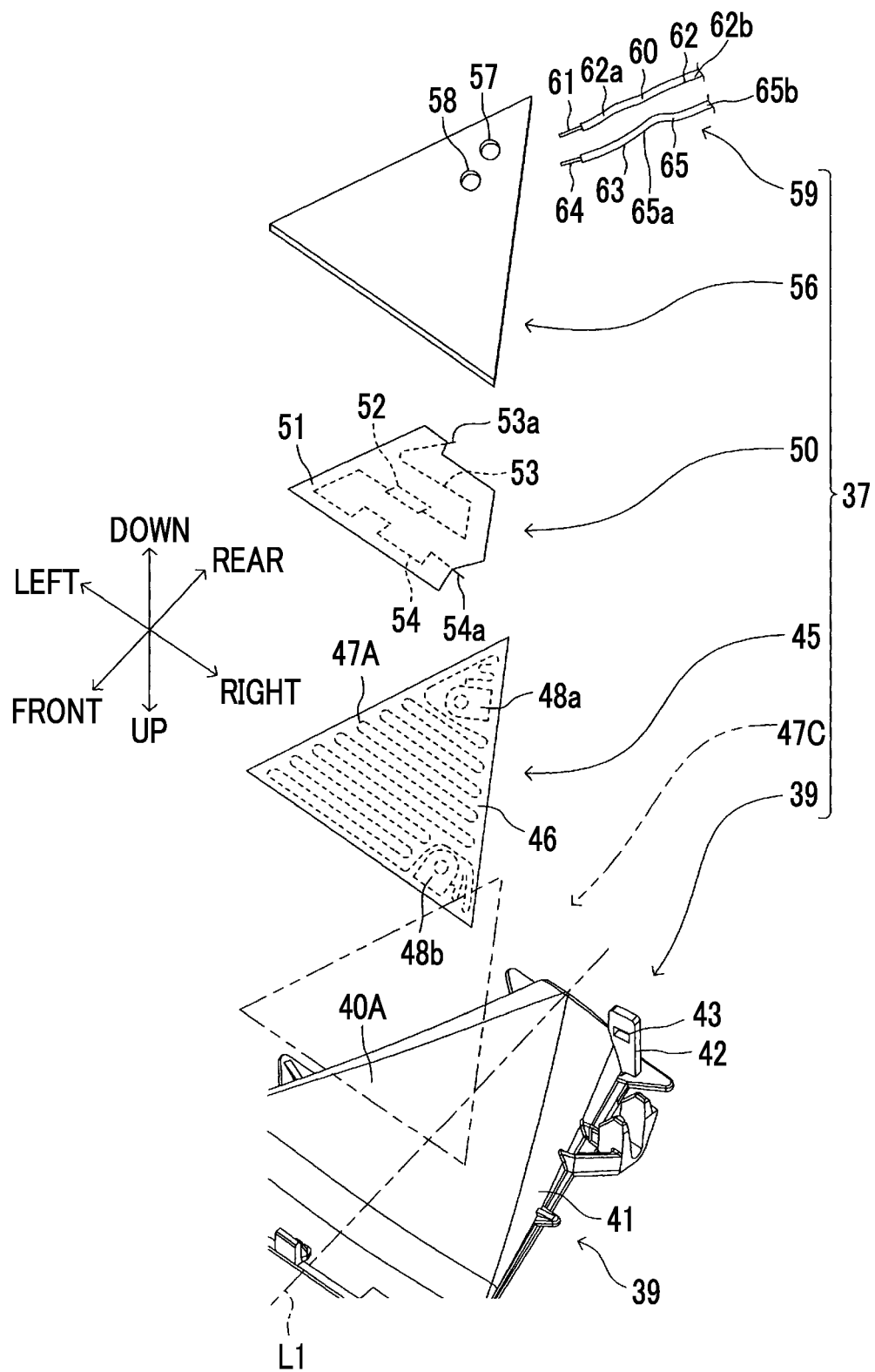
FIG. 5 is an exploded perspective view showing a shading heating unit (a first set) from below.

The shading hood 39 is a product integrally formed of a hard resin. The shading hood 39 integrally includes the section to be heated 40A serving as a plate-shaped body having an equilateral triangular shape (i.e., an equilateral triangular shape when seen in a front view), and a pair of sidewall sections 41 extending upward from both of left and right side edge portions of the section to be heated 40A. The section to be heated 40A is bilaterally symmetrical with reference to a centerline L1 extending in a front-rear direction shown in FIG. 5. Further, as shown in FIG. 4, a cross-sectional shape of the section to be heated 40A has a curved shape rather than a straight line. More specifically, the shape is a curved shape of a protrusion (as described below, when the shading heating unit 37 is fixed to the front window 85 via the bracket 12, a protrusion is directed toward the beam transmission section 85a side). As shown, a height of the sidewall sections 41 is gradually increased from a front end toward a rear end. As shown in FIG. 5 and FIG. 6, a cable support section 42 is formed in the vicinity of a right end of a rear end portion of a lower surface of the shading hood 39. The cable support section 42 extends downward from a lower surface of the shading hood 39. A band insertion hole 43 is formed in the cable support section 42 as a through-hole.

The heater module 45 integrally has a PET sheet 46 and a heater 47A. The PET sheet 46 is formed of PET (polyethylene terephthalate), and an appearance thereof has substantially the same shape as the section to be heated 40A. That is, the exterior has a bilaterally symmetrical equilateral triangular shape with reference to the centerline L1 shown in FIG. 7. The PET sheet 46 has a good insulation property. The heater 47A serving as a heating wire formed of a metal having good conductivity is formed at an upper surface of the PET sheet 46 substantially as a whole. For example, brass may be used as a material to configure the heater 47A. Both end portions of the heater 47A are constituted by a pair of lands 48a and 48b having an area larger than that of the other portion. The lands 48a and 48b are exposed in both of upper and lower surfaces of the PET sheet 46. The land 48a is formed in the vicinity of a corner section of a rear side of the PET sheet 46, and the land 48b is formed in the vicinity of a corner section of a front right side of the PET sheet 46. Here, "the vicinity of the corner section" is a region disposed between a midpoint that divides a line segment connecting a center of gravity G (see FIG. 7) of the section to be heated 40A and an apex of the corner section, and a division point at which a distance from the apex is ⅕ of the entire line segment when the midpoint and the division point are formed on the line segment. Meanwhile, in the specification, a region disposed closer to the apex than the division point is referred to as "a corner section adjacent to the apex." The portion of the heater 47A other than the lands 48a and 48b is formed at an upper surface of the PET sheet 46 by printing.

A lower surface of the double sided tape 47C having substantially the same shape as the section to be heated 40A and the PET sheet 46 is adhered to the upper surface of the PET sheet 46 to cover the heater 47A. Then, the heater module 45 is fixed to the shading hood 39 by adhering an upper surface of the double sided tape 47C to the lower surface of the section to be heated 40A. The double sided tape 47C has good thermal conductivity. A circumferential edge portion of the PET sheet 46 overlaps circumferential edge portions of the double sided tape 47C and the section to be heated 40A.

The fuse module 50 is integrated with a double sided tape 51, a fuse 52 and two lead wires 53 and 54. The double sided tape 51 is a sheet-shaped member having a shape shown in FIG. 5 and FIG. 7, and both surfaces thereof are adhesive surfaces. Thermal conductivity of the double sided tape 51 is lower than that of the shading hood 39, the PET sheet 46 and the double sided tape 47C. The fuse 52 serving as a current limiting element has a cylindrical insulating case and a weldable metal having conductivity and fixed in the insulating case. The insulating case of the fuse 52 is adhered to a substantially central portion of the upper surface of the double sided tape 51. The two lead wires 53 and 54 are adhered to the upper surface of the double sided tape 51 in the state shown in the drawings. One ends of the two lead wires 53 and 54 are disposed in the insulating case of the fuse 52 and connected to both ends of the weldable metal. Meanwhile, as shown in FIG. 5 and FIG. 7, both of connecting ends 53a and 54a serving as the other ends of the two lead wires 53 and 54 are disposed at an outer circumferential side of the double sided tape 51.

As the upper surface of the double sided tape 51 is adhered to the lower surface of the PET sheet 46, the fuse module 50 is fixed to the heater module 45. As shown in FIG. 7, the entire fuse module 50 is disposed at an inner circumferential side of the outer circumferential edge portion of the PET sheet 46. Both of the pair of lands 48a and 48b of the heater module 45 are disposed at the outer circumferential side of the double sided tape 51. Further, as shown in FIG. 7, the fuse 52 of the fuse module 50 is disposed at a position overlapping the center of gravity G of the section to be heated 40A in a thickness direction of the section to be heated 40A. That is, the fuse 52 is disposed on a straight line passing through the center of gravity G and extending in a plate thickness direction of the section to be heated 40A. The fuse 52 and the lead wires 53 and 54 (except for the connecting ends 53a and 54a) come in contact with the lower surface of the PET sheet 46. That is, the fuse 52 and the lead wires 53 and 54 (except for the connecting ends 53a and 54a) and the portion of the heater 47A other than the lands 48a and 48b are insulated from each other by the PET sheet 46 disposed therebetween. Further, the connecting end 54a of the lead wire 54 is connected to the lower surface of the land 48b of the PET sheet 46 by soldering (not shown).

The heat insulating material 56 having the insulation property has substantially the same shape as the section to be heated 40A. That is, the heat insulating material 56 is a sheet-shaped member having a regular triangular shape. A pair of through-holes 57 and 58 are formed in the vicinity of the corner section of the rear end of the heat insulating material 56. The thermal conductivity of the heat insulating material 56 is lower than that of the shading hood 39, the PET sheet 46, the double sided tape 47C and the double sided tape 51.

The upper surface of the heat insulating material 56 is adhered to the lower surface of the double sided tape 51. An area of the upper surface of the heat insulating material 56 that is not opposite to the double sided tape 51 comes in contact with the lower surface of the PET sheet 46. In addition, the circumferential edge portion of the heat insulating material 56 comes in contact with the shading hood 39 at the outer circumferential sides of the circumferential edge portions of the section to be heated 40A and the PET sheet 46. Further, when seen in the plate thickness direction of the section to be heated 40A, the through-holes 57 and 58 of the heat insulating material 56 are disposed on the centerline L1. When the heat insulating material 56 is fixed to the double sided tape 51, the through-hole 57 is disposed immediately below the land 48a of the PET sheet 46 and the through-hole 58 is disposed immediately below the connecting end 53a of the lead wire 53.

The cable module 59 includes a first electric power supply cable 60 and a second electric power supply cable 63, which are shown in FIG. 5 and so on, a connector 66 (see FIG. 3 and FIG. 9) connected to one ends of the first electric power supply cable 60 and the second electric power supply cable 63, and a binding tube 67.

The first electric power supply cable 60 includes an electric wire 61 constituted by a metal wire having good conductivity, and a covering tube 62 configured to cover an outer circumferential surface of the electric wire 61 except for both end portions. Similarly, the second electric power supply cable 63 includes an electric wire 64 constituted by a metal wire having good conductivity, and a covering tube 65 configured to cover the outer circumferential surface of the electric wire 64 except for both end portions. Two metal contacts (not shown) are installed in the connector 66. One of the two contacts is a positive electrode, and the other contact is a negative electrode. One ends of the first electric power supply cable 60 and the second electric power supply cable 63 are connected to the connector 66, and one ends of the electric wire 61 and the electric wire 64 are connected to two contacts. Further, as shown in FIG. 3 and FIG. 6, portions of the covering tube 62 and the covering tube 65 except for both of front and rear end portions are inserted into the single binding tube 67. That is, the binding tube 67 binds the covering tube 62 and the covering tube 65 such that the tubes are not separated from each other.

As shown in FIG. 8B, the other end of the electric wire 61 of the first electric power supply cable 60 is inserted into the through-hole 57 of the heat insulating material 56, and the other end of the electric wire 61 is connected to the lower surface of the land 48a by a solder 70. While not shown, the other end of the electric wire 64 of the second electric power supply cable 63 is inserted into the through-hole 58 of the heat insulating material 56. Then, the other end of the electric wire 64 and the connecting end 53a of the lead wire 53 are connected to each other by soldering.

Further, as shown in FIG. 6 and FIG. 8B, a sealing material 71 having an insulation property is fixed to the lower surface of the heat insulating material 56 and a section to be fixed 62a adjacent to the end portion of the through-hole 57 side of the covering tube 62 of the first electric power supply cable 60, and the through-hole 57 is covered by the sealing material 71. Similarly, as shown in FIG. 6, a sealing material 72 having an insulation property is fixed to the lower surface of the heat insulating material 56 and a section to be fixed 65a (see FIG. 5) adjacent to the end portion of the through-hole 58 of the covering tube 65 of the second electric power supply cable 63, and the through-hole 58 is covered by the sealing material 72.

The tying band 74 shown in FIG. 6 has flexibility and a shape holding function. That is, the tying band 74 is deformed when a force is applied to the tying band 74, and the tying band 74 holds its shape when no force is applied to the tying band 74. The tying band 74 is inserted into the band insertion hole 43 of the cable support section 42 of the shading hood 39. Further, the tying band 74 is fixed to the cable support section 42 while wound around the vicinity of the end portion of the shading hood 39 side of the binding tube 67 which is brought into contact with the cable support section 42. That is, the vicinity of the end portion of the shading hood 39 side of the binding tube 67 is fixed to the cable support section 42 by the tying band 74. In other words, sections to be supported 62b and 65b (see FIG. 5) of the covering tubes 62 and 65 disposed in the binding tube 67 and formed at positions slightly separated from the sections to be fixed 62a and 65a are fixed to the cable support section 42 by the tying band 74.

Figure 10:
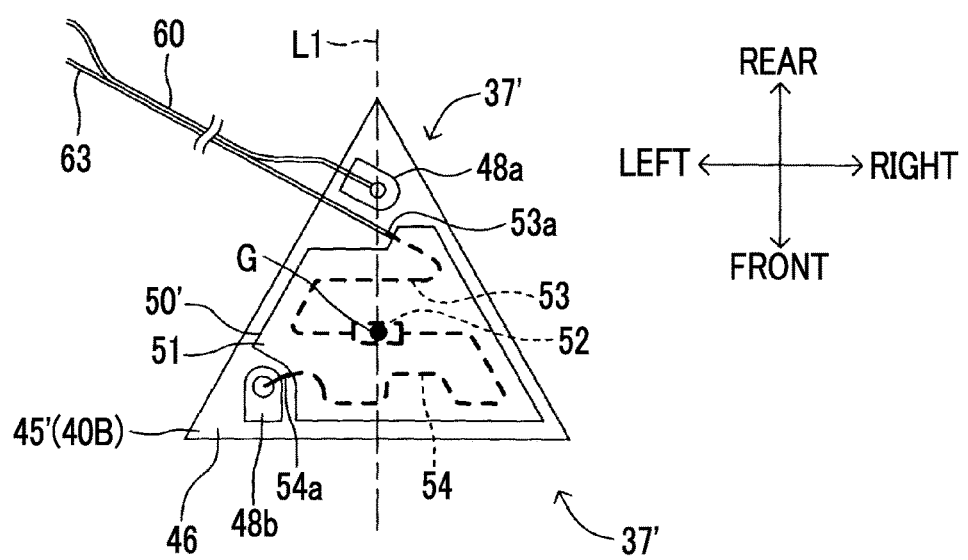
FIG. 10 is a schematic view similar to FIG. 7, showing a shading heating unit (a second set) having a bilaterally symmetrical structure with respect to the shading heating unit (the first set) of FIG. 5 to FIG. 7.
Figure 11:
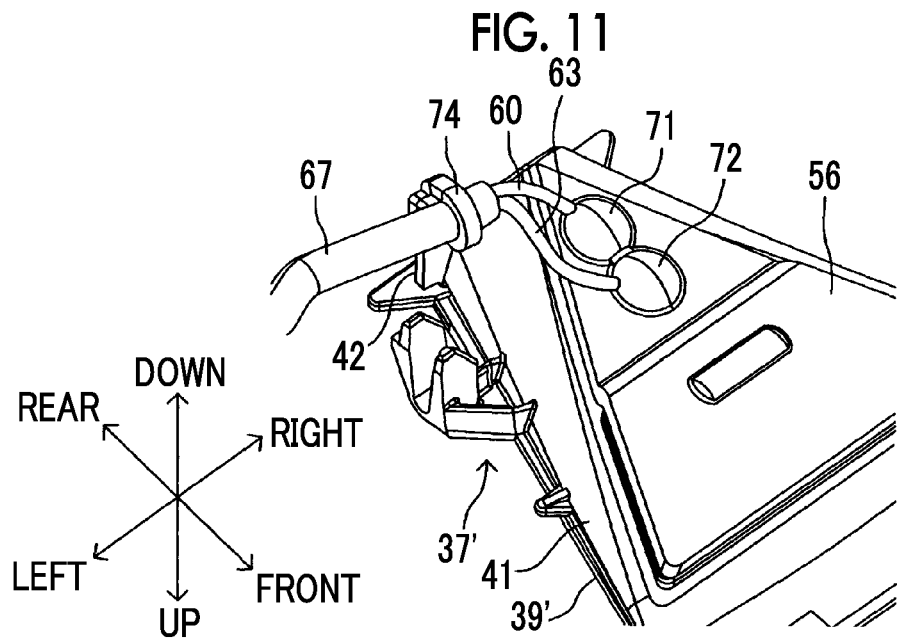
FIG. 11 is perspective view similar to FIG. 6, showing the shading heating unit (the second set)

Further, the photographing device 10 of the embodiment includes the shading heating unit 37' shown in FIG. 10 and FIG. 11. The shading heating unit 37 and the shading heating unit 37' may be selectively mounted on the bracket 12. The shading heating unit 37' includes the shading hood 39', the heater module 45' and the fuse module 50', which are bilaterally symmetrical to the shading hood 39 the heater module 45, and the fuse module 50 with reference to the centerline L1, and the heat insulating material 56, the cable module 59 and the tying band 74. The section to be heated 40B of the shading hood 39' has the same specifications as the section to be heated 40A. In other words, the section to be heated 40B and the section to be heated 40A are bilaterally symmetrical with reference to the centerline L1. In addition, a heater 47B of the heater module 45' is bilaterally symmetrical with respect to the heater 47A with reference to the centerline L1. The PET sheet 46 of the heater module 45' has the same specifications as the PET sheet 46 of the heater module 45. The fuse 52 of the fuse module 50' of the shading heating unit 37' also overlaps the position of the center of gravity G of the section to be heated 40B in the plate thickness direction of the section to be heated 40B (see FIG. 10). In the specification, the shading heating unit 37' may be referred to as "a second set 37'".

As described above, in FIG. 1 to FIG. 8B, the shading heating unit 37 (the first set) is detachably fixed to the bracket 12 in a state in which the shading hood 39 is fitted into the support section 13. Meanwhile, instead of the shading heating unit 37, the shading heating unit 37' (the second set) may be detachably fixed to the bracket 12. Also in this case, the shading hood 39' is fitted into the support section 13.

As shown in FIG. 4, the camera unit 25 is detachably fixed to the bracket 12 by engaging an engaging section of the camera support bracket 18 integrated with the camera unit 25 with an engaging section formed at the lower surface of the bracket 12. Then, as shown in FIG. 2, the shading hood 39 of the shading heating unit 37 (or the shading hood 39' of the shading heating unit 37') is fitted into the hood mounting concave section 27 of the camera unit 25, and further, a front section of the imaging unit 28 is disposed immediately above a rear end portion of the section to be heated 40A (or 40B) via a gap between the rear end portions of the left and right sidewall sections 41.

The main cover 76 is a product integrally formed of a hard resin. The main cover 76 is a hollow member, in which the entire upper surface and the rear end surface thereof are opened, and the front-rear dimension and the left-right dimension of which are larger than those of the bracket 12, the camera support bracket 18, the camera unit 25 and the shading hood 39 (39'). Further, an attachment concave section 77 is formed in a rear section of the bottom surface of the main cover 76.

The sub-cover 80 is a product integrally formed of a hard resin. The sub-cover 80 is detachably fixed to the main cover 76 to be disposed in the attachment concave section 77 through engagement of the engaging section with the engaging section of the main cover 76.

The main cover 76 and the sub-cover 80 integrated with each other are detachably fixed to the lower surface of the bracket 12 while the camera support bracket 18, the camera unit 25 and the shading hood 39 (or the shading hood 39') are disposed in an internal space of the main cover 76. The connector 66 of the cable module 59 is pulled out toward a rear side of the main cover 76 through a rear end opening of the main cover 76.

The photographing device 10 integrated in this way is fixed to the surface of the forward extension section 86a of the shading sheet 86 inside the vehicle using an adhesive agent (not shown) applied to the adhesive surfaces 14 of the bracket 12. Then, the support section 13 of the bracket 12, the section to be heated 40A of the shading heating unit 37 (or the section to be heated 40B of the shading heating unit 37') and the imaging unit 28 of the camera unit 25 are disposed at a position opposite to the light transmission hole 86b of the shading sheet 86. Accordingly, the natural light transmitted from the front side to the rear side of the front window 85 and rearward through the beam transmission section 85a and the light transmission hole 86b of the shading sheet 86 passes through the lens 29 of the imaging unit 28 and then is received by the imaging unit 28.

Figure 9:
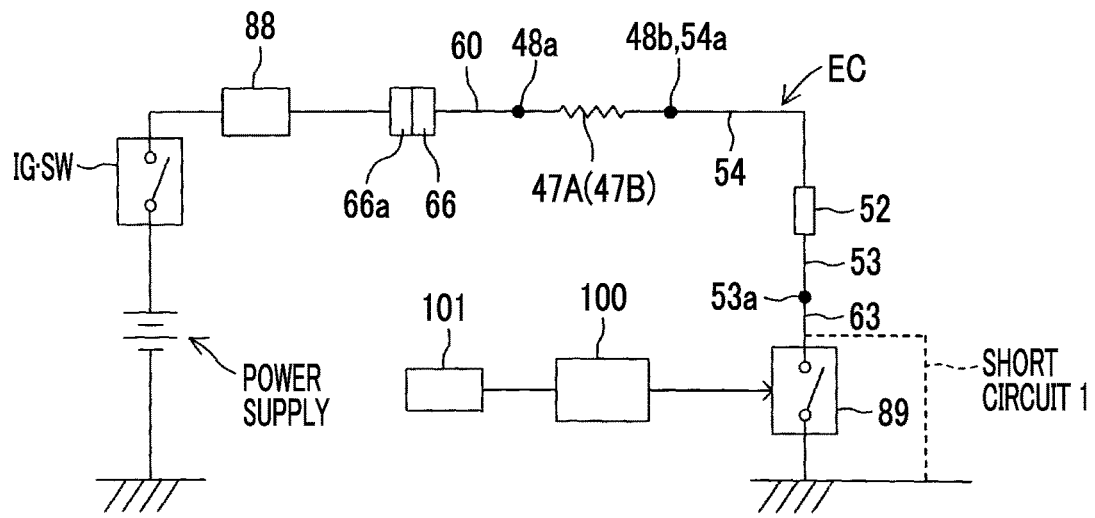
FIG. 9 is a schematic view showing a series electric circuit including a heater, a fuse unit and a cable module.

The connector 66 of the shading heating unit 37 (37') is connected to a vehicle body-side connector 66a installed at the vehicle body side (see (FIG. 9). Specifically, the positive electrode and the negative electrode of the connector 66 are connected to the positive electrode and the negative electrode of the vehicle body-side connector 66a, respectively. The vehicle body-side connector 66a is connected to a constant potential circuit 88. Further, the constant potential circuit 88 is connected to a vehicle-mounted power supply (a battery) via an ignition switch (IG/SW). A voltage of the power supplied to the vehicle body-side connector 66a from the power supply via the ignition switch and the constant potential circuit 88 is constant. As shown in FIG. 9, the heater 47A (47B), the fuse 52, the lead wires 53 and 54, the first electric power supply cable 60, the second electric power supply cable 63 and the connector 66 form a series electric circuit EC. A switch element 89 is installed at the series electric circuit EC. Further, ON/OFF switching of the switch element 89 can be controlled by the control device 100. The switch element 89 may be constituted by, for example, a semiconductor switch element.

In the components as described above, the brake apparatus, the brake actuator, the vehicle speed detection apparatus, the control device 100 and the imaging element 30 of the vehicle are components of the pre-crash safety system (PCS).

Next, operations of the vehicle and the photographing device 10 will be described. According to an operation of an ignition key (not shown), in a state in which power of the vehicle-mounted power supply can be supplied to the series electric circuit EC, when the engine is started, the control device 100 causes the imaging unit 28 to start a photographing operation and acquires an outdoor air temperature from the temperature sensor 101.

The imaging element 30 of the imaging unit 28 images the reflected beam reflected rearward by an obstacle (for example, a separate vehicle) disposed in front of the vehicle on which the photographing device 10 is mounted and passing through the beam transmission section 85a of the front window 85, the light transmission hole 86b of the shading sheet 86 and the lens 29. Further, the imaging unit 28 transmits all of the imaging data to the control device 100 each time a certain time elapses.

If the control device 100 determines that "a subject of the imaging data is not an obstacle" or "a distance from the imaging element 30 to the obstacle is larger than a distance represented by the approach determination data" during forward travel of the vehicle, the vehicle continues the forward travel as it is. Further, determination of the type of the subject of the imaging data by the control device 100 may be performed using, for example, a known pattern matching method.

Meanwhile, during forward travel of the vehicle, when the control device 100 determines that "a current vehicle speed is within a predetermined range" and "the subject of the imaging data is the obstacle and the distance from the imaging element 30 to the obstacle is smaller than the distance represented by the approach determination data," the control device 100 transmits a signal to the brake actuator. Then, when the brake actuator is operated, the brake apparatuses apply the braking force to the wheels even when the driver does not press the brake pedal. As a result, the speed of the vehicle is decreased, and the vehicle is stopped in some cases.

The temperature detection operation by the temperature sensor 101 is constantly performed while the engine is operated. Further, before the temperature sensor 101 starts a temperature detection operation, the switch element 89 is in an OFF state. The temperature sensor 101 constantly continuously transmits a signal related to the detected temperature to the control device 100 while the engine is operated.

Incidentally, when the inside of the vehicle is heated in the case in which an outdoor air temperature of the vehicle is low, dewing may be generated in the beam transmission section 85a of the front window 85. In addition, when the outdoor air temperature is low, ice or frost may adhere to the beam transmission section 85a. If such a phenomenon occurs in the beam transmission section 85a, the imaging element 30 may image an unclear subject image or may not image the obstacle. In this case, the control device 100 may not precisely perform distance determination based on the determination of the type of the subject of the imaging data and the approach determination data.

Here, the control device 100 repeats an operation of switching the switch element 89 in the OFF state to the ON state for a predetermined time and then switching the switch element 89 to the OFF state for a predetermined time when the temperature detected by the temperature sensor 101 is equal to or less than a set temperature. When the switch element 89 is set to the ON state, power of the power supply is supplied to the series electric circuit EC. Then, when the power is supplied to the heater 47A (47B) constituted by the heating wire, the heater 47A (47B) generates heat. As described above, thermal conductivity of the heat insulating material 56 is lower than that of the shading hood 39 (and the shading hood 39'), the PET sheet 46, the double sided tape 47C and the double sided tape 51. For this reason, there is almost no probability of the heat generated by the heater 47A (47B) escaping to the outside from the lower surface and the circumferential surface of the heat insulating material 56. Accordingly, most of the heat generated by the heater 47A (47B) is efficiently transferred to the lower surface of the section to be heated 40A (40B) from the heater 47A (47B) via the double sided tape 47C and transferred to the entire section to be heated 40A (40B).

As a result, radiant heat discharged from the upper surface (the front surface) of the section to be heated 40A (40B) is transferred to the beam transmission section 85a, and dew or the like on the beam transmission section 85a is removed by the radiant heat. As described with reference to FIG. 4, since the cross-sectional shape of the section to be heated 40A (40B) has a curved shape of the protrusion toward the beam transmission section 85a, the radiant heat discharged from the section to be heated 40A (40B) is applied to the entire beam transmission section 85a while being diffused radially. That is, dew or the like of the entire beam transmission section 85a can be removed by the radiant heat. For this reason, since the imaging element 30 of the imaging unit 28 can image a clear subject image, the control device 100 can precisely perform determination of a kind of the subject of the imaging data and distance determination based on approach determination data.

However, when the heater 47A (47B) continuously generates heat for a long time, the heater 47A (47B), the section to be heated 40A (40B) and peripheries thereof are excessively heated to a high temperature, and bad influence may be exerted on members disposed around the heater 47A (47B). That is, for example, it may be impossible for the imaging element 30 of the imaging unit 28 to image the clear subject image. For this reason, when the temperature detected by the temperature sensor 101 is equal to or less than the set temperature, the control device 100 switches the ON state and the OFF state at a predetermined time intervals rather than maintaining the switch element 89 in the ON state for a long time. That is, the heater 47A (47B) is prevented from continuously generating heat for a long time.

However, if the series electric circuit EC does not include the fuse 52, when a short circuit (ground) occurs in the series electric circuit EC in a state of "a short circuit 1" of FIG. 9, power from the power supply is supplied to the heater 47A (47B) even though the control device 100 switches the switch element 89 to the OFF state. That is, in this case, power from the power supply is continuously supplied to the heater 47A (47B) for a long time. For this reason, the heater 47A (47B), the section to be heated 40A (40B) and the peripheries thereof may be excessively heated to a high temperature.

However, the photographing device 10 of the embodiment includes the fuse 52 installed on the series electric circuit EC. A weldable metal of the fuse 52 is heated by the heat transferred from the heater 47A (47B) via the lead wires 53 and 54 and the heat transferred from the section to be heated 40A (40B). If a short circuit occurs in the "short circuit 1" state shown in FIG. 9, the heater 47A (47B) and the section to be heated 40A (40B) are heated to a high temperature. Then, the temperature of the weldable metal that was previously a temperature lower than a predetermined value reaches a temperature equal to or higher than the predetermined value, and as a result, the weldable metal is cut. Then, since power of the power supply does not flow into the heater 47A (47B), the heater 47A (47B), the section to be heated 40A (40B) and the peripheries thereof are prevented from being excessively heated to a high temperature.

Further, when the heater 47A (47B) generates heat, the section to be heated 40A (40B) is heated to a high temperature. In the section to be heated 40A (40B), the center of gravity G is most easily overheated, and the heat is easily gradually discharged from the center of gravity G toward the circumferential edge portion. Accordingly, the section to be heated 40A (40B) heated by the heater 47A (47B) is not uniformly heated as a whole but the center of gravity G is most easily heated to a high temperature and the temperature lowers from the center of gravity G toward the circumferential edge portion. For this reason, if the fuse 52 overlaps the circumferential edge portion or the vicinity of the circumferential edge portion of the section to be heated 40A (40B) in the plate thickness direction of the section to be heated 40A (40B), for example, when a short circuit occurs in the series electric circuit EC, a quantity of heat transferred to the fuse 52 from the circumferential edge portion or the vicinity of the circumferential edge portion of the section to be heated 40A (40B) via the PET sheet 46 is not increased. For this reason, in this case, the fuse 52 is not easily heated to a high temperature, and thus, the fuse 52 is not easily cut even if a short circuit occurs.

On the other hand, in the embodiment, when the short circuit occurs in the series electric circuit EC, since the quantity of the heat transferred to the fuse 52 from the center of gravity G of the section to be heated 40A (40B) via the PET sheet 46 is increased, the fuse 52 is easily heated to a high temperature. Accordingly, the fuse 52 is easily cut in comparison with the case in which the fuse 52 overlaps the circumferential edge portion or the vicinity of the circumferential edge portion of the section to be heated 40A (40B) in the plate thickness direction of the section to be heated 40A (40B). For this reason, the heater 47A (47B), the section to be heated 40A (40B) and the peripheries thereof can be more reliably prevented from being excessively heated to a high temperature.

In addition, the land 48a of the heater 47A (47B) is formed in the vicinity of the corner section of the rear side of the PET sheet 46, and on the other hand, the land 48b is formed in the vicinity of the corner section of the front right side of the PET sheet 46. That is, a distance between both end portions of the heater 47A (47B) is a certain length. In other words, the distance between both end portions of the heater 47A (47B) is not extremely short. For this reason, the solder 70 applied to the land 48a and the solder applied to the land 48b are separated from each other by a certain distance. An electrical resistance of an integrated section of the lands 48a and 48b serving as both end portions of the heater 47A (47B) and the solders is reduced further at a portion of the heater 47A (47B) than the lands 48a and 48b. For this reason, when current flows through the heater 47A (47B), the land 48a (the solder 70) and the land 48b (the solder) having a relatively low temperature in the heater 47A (47B) are not concentrated in one narrow region of the section to be heated 40A (40B). For this reason, when the section to be heated 40A (40B) is heated by the heater 47A (47B), the entire section to be heated 40A (40B) is likely to have a roughly uniform temperature. Accordingly, a partial region of the beam transmission section 85a is not largely decreased in temperature in comparison with the other region. In other words, the entire beam transmission section 85a is roughly uniformly heated by the section to be heated 40A (40B).

Further, since a distance between the solder 70 on the land 48a and the solder on the land 48b has a certain length, even when foreign substances (for example, water or waste) enters between the two solders, probability of simultaneous contact between the foreign substances and two solders is low. That is, probability of a short circuit between the two solders due to foreign substances is low.

Further, the through-holes 57 and 58 of the heat insulating material 56 are closed by the pair of sealing materials 71 and 72. Accordingly, there is no probability of intrusion of foreign substances (for example, water, waste, or the like) between the heat insulating material 56, and the heater module 45 and the fuse module 50 from the outside of the heat insulating material 56 through the through-holes 57 and 58. Accordingly, for example, probability of occurrence of a short circuit between the heater 47A (47B) and the lead wires 53 and 54 or a short circuit between the portions of the heater 47A (47B) due to foreign substances is low.

Further, the pair of sealing materials 71 and 72 fix the section to be fixed 62a of the covering tube 62 of the first electric power supply cable 60 and the section to be fixed 65a of the covering tube 65 of the second electric power supply cable 63 to the heat insulating material 56. In addition, the vicinity of the end portion of the shading hood 39 (39') side of the binding tube 67 (in other words, the section to be supported 62b of the covering tube 62 and the section to be supported 65b of the covering tube 65) is fixed to the cable support section 42 by the tying band 74. Accordingly, when a tensile load away from the heat insulating material 56 is applied to the first electric power supply cable 60 and the second electric power supply cable 63, probability of separation of the end portion of the electric wire 61 of the first electric power supply cable 60 and the end portion of the electric wire 64 of the second electric power supply cable 63 from the land 48a of the heater module 45 and the connecting end 53a of the fuse module 50 is low. In addition, probability of delamination of the land 48a of the heater module 45 from the PET sheet 46 by the tensile force received from the end portion of the electric wire 61 of the first electric power supply cable 60 or delamination of the connecting end 53a of the fuse module 50 from the heater module 45 by the tensile force received from the end portion of the electric wire 64 of the second electric power supply cable 63 together with the double sided tape 51 is low.

The binding tube 67 binds the covering tube 62 and the covering tube 65. Further, the distance between the end portions of the heater modules 45 and 45' and the fuse modules 50 and 50' side of the first electric power supply cable 60 (the electric wire 61) and the second electric power supply cable 63 (the electric wire 64) is short. For this reason, the first electric power supply cable 60 and the second electric power supply cable 63 are pulled from adjacent positions of the heater modules 45 and 45' and the fuse modules 50 and 50' toward the outside. Accordingly, in comparison with the case in which the covering tube 62 and the covering tube 65 are not bound and the first electric power supply cable 60 and the second electric power supply cable 63 are drawn from positions remotely separated from the heater modules 45 and 45' and the fuse modules 50 and 50', routing of the first electric power supply cable 60 and the second electric power supply cable 63 in the vehicle can be easily performed.

When disposition of the vehicle body-side connector 66a (electrical system parts) in the vehicle is changed, a drawing condition (a drawing direction) of the first electric power supply cable 60 and the second electric power supply cable 63 from the heater modules 45 and 45' and the fuse modules 50 and 50' may be necessary to be changed. For this reason, as described above, the photographing device 10 of the embodiment includes the shading heating unit 37 (the first set) and the shading heating unit 37' (the second set), which are selectively attachable to the bracket 12. Then, as the shading heating unit 37 and the shading heating unit 37' are selected and mounted on the bracket 12, the drawing condition of the first electric power supply cable 60 and the second electric power supply cable 63 from the heater modules 45 and 45' and the fuse modules 50 and 50' may be changed (see FIG. 6, FIG. 7, FIG. 10 and FIG. 11). That is, when the shading heating unit 37 is used, as shown in FIG. 6 and FIG. 7, the first electric power supply cable 60 and the second electric power supply cable 63 can be drawn rightward from the heater module 45 and the fuse module 50. On the other hand, when the shading heating unit 37' is used, as shown in FIG. 10 and FIG. 11, the first electric power supply cable 60 and the second electric power supply cable 63 can be drawn leftward from the heater module 45' and the fuse module 50'. In this way, the drawing condition of the first electric power supply cable 60 and the second electric power supply cable 63 from the heater modules 45 and 45' and the fuse modules 50 and 50' can be changed in consideration of disposition of the vehicle body-side connector 66a (the electrical system parts) in the vehicle.

Further, the present disclosure is not limited to the embodiment but various modified examples may be employed without departing from the scope of the present disclosure.

Figure 12:
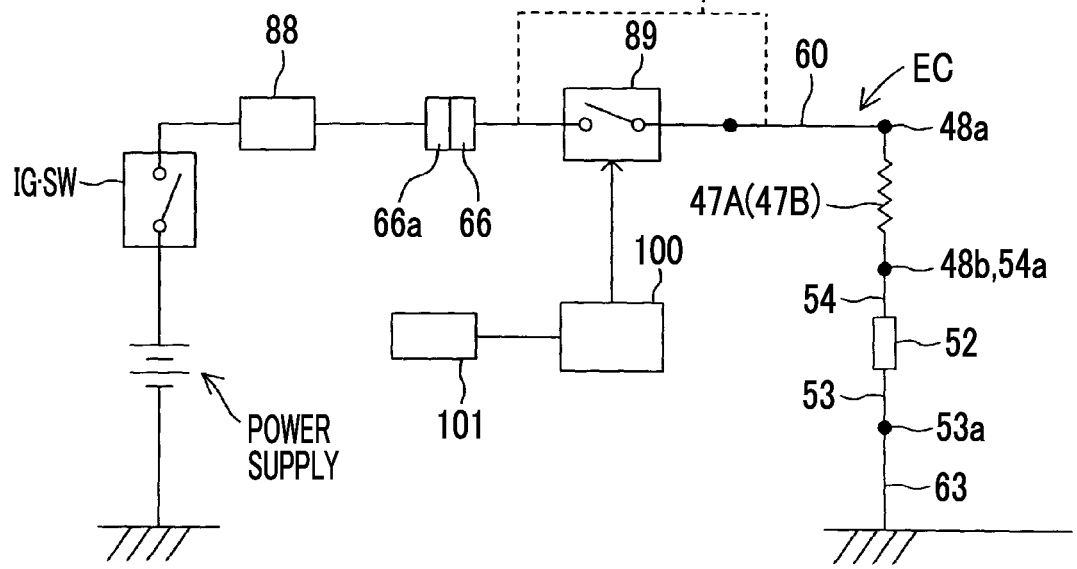
FIG. 12 is a schematic view similar to FIG. 9, showing a series electric circuit of a first modified example of the present disclosure.

For example, the series electric circuit EC may be configured as an aspect of the first modified example shown in FIG. 12. In this case, a short circuit (a sky failure) may occur in the series electric circuit EC in the "short circuit 2" state shown in FIG. 12. However, in this case, when the weldable metal of the fuse 52 is heated to a temperature equal to or higher than a predetermined value, the weldable metal is cut. As a result, since power of the power supply does not flow through the heater 47A (47B), the heater 47A (47B), the section to be heated 40A (40B) and the peripheries thereof are inhibited from being excessively heated to a high temperature.

A means separated from the fuse 52 may be used as the current limiting element installed in the series electric circuit EC.

Figure 13:
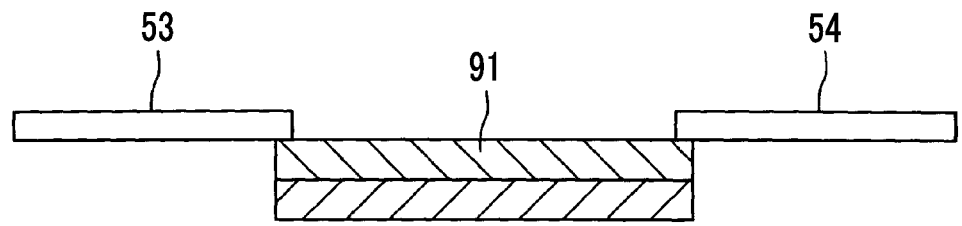
FIG. 13 is a cross-sectional view showing a major part of a series electric circuit of a second modified example of the present disclosure using a bi-metal instead of a fuse module.
Figure 14:
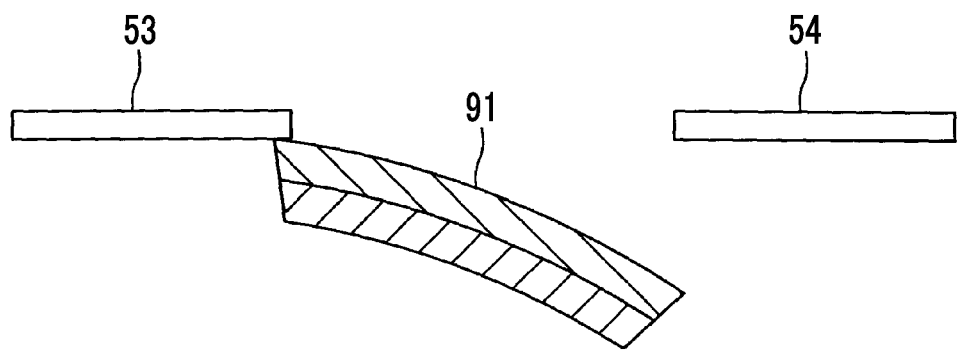
FIG. 14 is a cross-sectional view similar to FIG. 13 when the bi-metal of the second modified example is at a high temperature.

For example, in a second modified example shown in FIG. 13 and FIG. 14, a bi-metal 91 is installed between the end portions of the pair of lead wires 53 and 54 instead of the fuse 52. One end portion of the bi-metal 91 is fixed to the end portion of the lead wire 53. On the other hand, the other end portion of the bi-metal 91 can come in contact with and be separated from the end portion of the lead wire 54. When the temperature of the bi-metal 91 is lower than the predetermined value, as shown in FIG. 13, the other end portion of the bi-metal 91 comes in contact with the end portion of the lead wire 54. On the other hand, when the temperature of the bi-metal 91 is equal to or higher than the predetermined value, as shown in FIG. 14, the bi-metal 91 is deformed and the other end portion of the bi-metal 91 is separated from the end portion of the lead wire 54. For this reason, since power from the power supply does not flow through the heater 47A (47B), the heater 47A (47B), the section to be heated 40A (40B) and the peripheries thereof are inhibited from being excessively heated to a high temperature.

Figure 15:
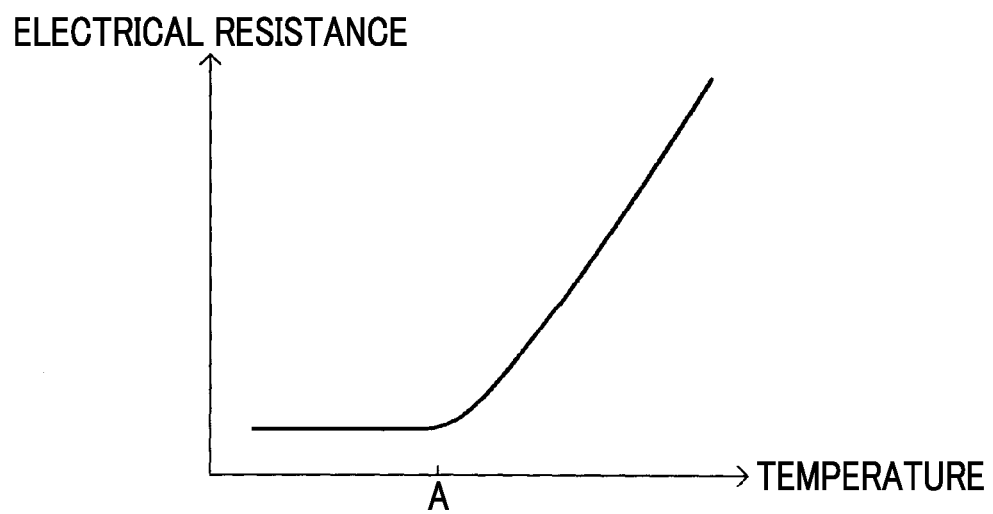
FIG. 15 is a graph showing properties of a PTC thermistor used in a series electric circuit of a third modified example of the present disclosure.

A third modified example shown in FIG. 15 is an example in which a PTC thermistor (not shown) is installed between the end portions of the pair of lead wires 53 and 54 instead of the fuse 52. As is well known, the PTC thermistor has the properties shown in the graph of FIG. 15. That is, when the temperature of the PTC thermistor is within a low temperature region lower than a predetermined value A, the electrical resistance is maintained at a predetermined low resistance value. However, when the temperature of the PTC thermistor is equal to or higher than the predetermined value A, the electrical resistance is abruptly increased. For this reason, when the heater 47A (47B) is excessively heated to a high temperature due to the short circuit of the series electric circuit EC and the heat is transferred to the PTC thermistor, the electrical resistance is abruptly increased as the temperature of the PTC thermistor becomes equal to or higher than the predetermined value A. Since the voltage of the power supplied to the heater 47A (47B) side from the constant potential circuit 88 is constant, when the electrical resistance of the PTC thermistor is increased, the current flowing through the heater 47A (47B) is decreased. For this reason, since the temperature of the heater 47A (47B) is gradually decreased, the heater 47A (47B), the section to be heated 40A (40B) and the peripheries thereof are prevented from being excessively heated to a high temperature.

Further, a thermostat in addition to the bi-metal 91 and the PTC thermistor may be installed between the lead wire 53 and the lead wire 54 as the current limiting element.

Figure 16:
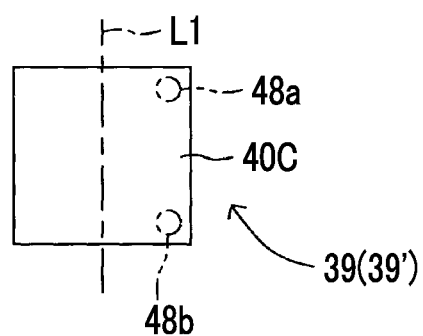
FIG. 16 is a schematic view showing a section to be heated of a fourth modified example of the present disclosure.
Figure 17:
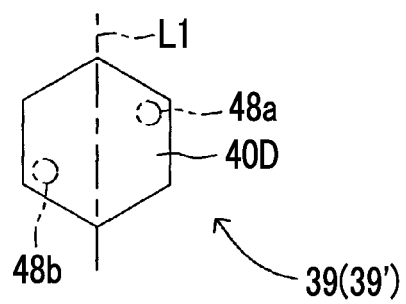
FIG. 17 is a schematic view showing a section to be heated of a fifth modified example of the present disclosure.

A fourth modified example shown in FIG. 16 is an example in which a section to be heated 40C of the shading hood 39 (39') has a square shape. The section to be heated 40C is also bilaterally symmetrical with reference to the centerline L1. A fifth modified example shown in FIG. 17 is an example in which a section to be heated 40D of the shading hood 39 (39') has a regular hexagonal shape. The section to be heated 40D is also bilaterally symmetrical with reference to the centerline L1. In these modified examples, the land 48a and the land 48b of the heater fixed to the sections to be heated 40C and 40D via the PET sheet (not shown) are disposed in a shown aspect. That is, in the modified examples, the land 48a and the land 48b are disposed at different corner sections (the corner sections adjacent to the apex or the vicinity of the corner sections) of the sections to be heated 40C and 40D. The photographing device 10 of these modified examples can also exhibit the same effect as the embodiment.

Further, the section to be heated of the shading hood 39 (39') may have a regular polygonal shape different from the sections to be heated 40A, 40B, 40C and 40D.

In addition, the section to be heated is not a perfect regular polygonal shape but may not be substantially a regular polygonal shape. That is, for example, outer circumferential sections of the corner sections may be constituted by curved surfaces.

Further, the section to be heated may be a polygonal shape or substantially a polygonal shape other than a regular polygonal shape (including substantially a regular polygonal shape). For example, the section to be heated may be an isosceles triangular shape (instead of an equilateral triangular shape).

Further, as the shading hood 39 (39') is rotated around an axis extending in the plate thickness direction of the section to be heated in a state in which a shape of the support section 13 of the bracket 12 is changed, the shading hood 39 (39') may be attachable to the bracket 12 (the support section 13) while a position in the rotational direction is changed. In this way, the position in the rotational direction of the sections to be heated 40A, 40B, 40C and 40D of the shading hood 39 (39') can be easily changed. That is, the drawing condition of the first electric power supply cable 60 and the second electric power supply cable 63 from the sections to be heated 40A, 40B, 40C and 40D (the heater modules 45 and 45') can be easily changed.

In the embodiment, the land 48a may be formed at the one corner section adjacent to the apex rather than the vicinity of the one corner section (the vicinity of the corner section of the upper side of FIG. 7) of the PET sheet 46. That is, the land 48a may be formed at a position closer to the apex (the apex of the upper side of FIG. 7) of the corner section than the position of the embodiment. Similarly, the land 48b may be formed at the corner section adjacent to the apex (for example, the corner section adjacent to the apex of the lower right side of FIG. 7) rather than the vicinity of the corner section (for example, the vicinity of the corner section of the lower right side of FIG. 7). That is, the land 48b may be formed at a position closer to the apex (for example, the apex of the lower right side of FIG. 7) of the corner section than the position of the embodiment.

Switching of ON and OFF of the switch element 89 may be performed by an operation means (for example, a button formed at an instrument panel), which is manually operable.

The shading hoods 39 and 39' may have a structure constituted by the cable support section 42 and the other portion. In this case, the cable support section 42 and the other portion are separately manufactured and are fixed to each other by a fixing means (for example, a bolt and a nut) after manufacture.

A light emitting section and a light receiving section of infrared light may be used as the range finding means of the camera unit 25 instead of the imaging element 30, or a light emitting section and a light receiving section of a millimeter wave radar may be used. In this case, a single eye type imaging element 30 may be used.

Only the range finding means (for example, the light emitting section and the light receiving section of the infrared light or the light emitting section and the light receiving section of the millimeter wave radar) may be installed at the camera unit 25 without the imaging unit 28. In addition, the range finding means may also be omitted from the camera unit 25.

The photographing device for a vehicle may also be mounted on the window section separated from the front window. For example, the photographing device for a vehicle may be mounted on the back window of the vehicle such that an obstacle disposed behind the vehicle can be detected.

Figure 18:
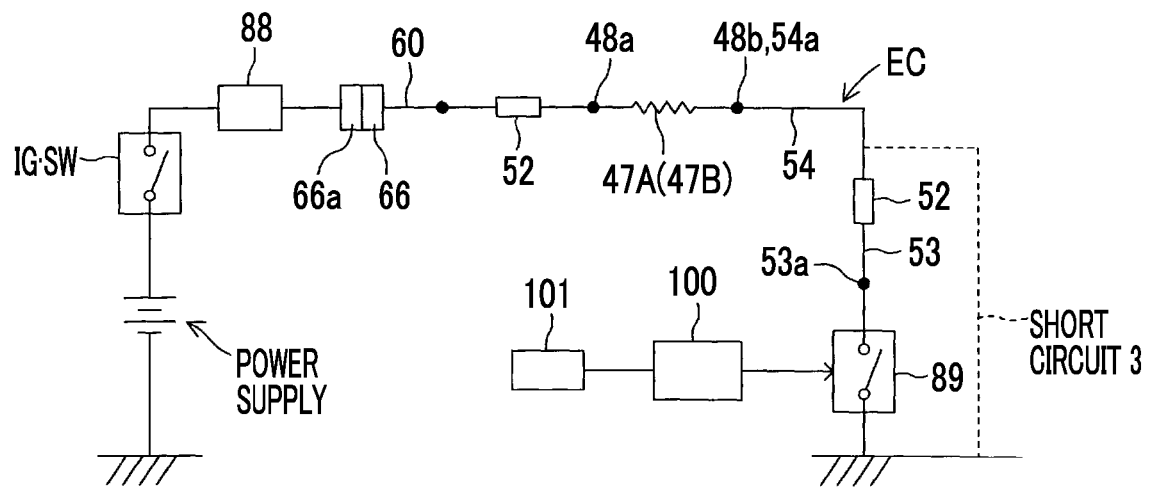
FIG. 18 is a schematic view similar to FIG. 9, showing a sixth modified example of the present disclosure.

As shown in FIG. 18, the series electric circuit EC may also be configured with two current limiting elements (for example, the fuses 52) disposed at both sides of the heater 47A (47B). In this case, when a short circuit (a ground failure) occurs in the series electric circuit EC in "a short circuit 3" condition, power of the power supply does not flow through the heater 47A (47B). For this reason, the heater 47A (47B), the section to be heated 40A (40B) and the peripheries thereof are inhibited from being excessively heated to a high temperature.

Figure 19:
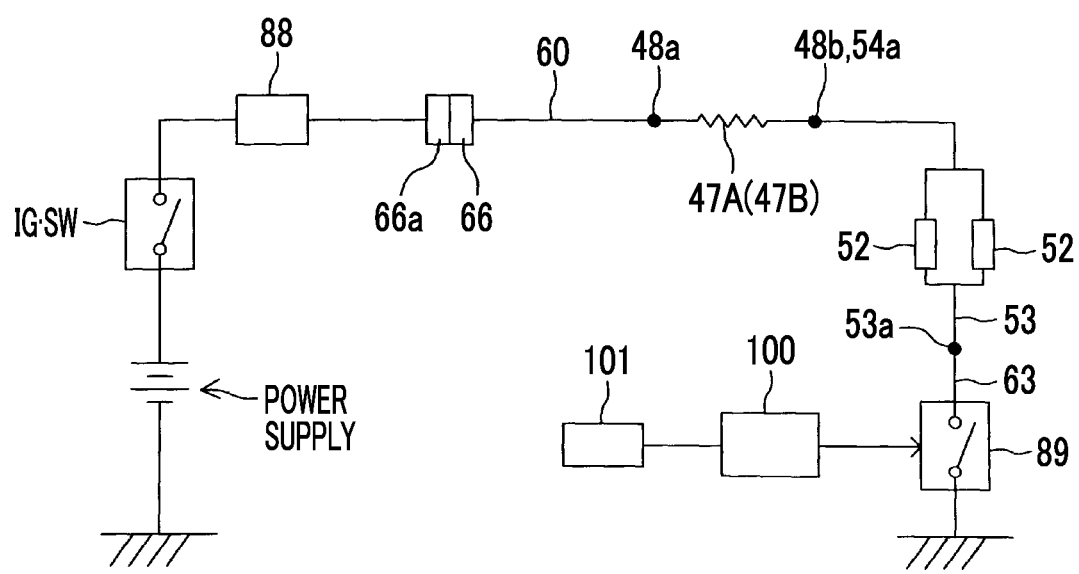
FIG. 19 is a schematic view similar to FIG. 9, showing a seventh modified example of the present disclosure.

The electric circuit in which the heater 47A (47B), the current limiting element (for example, the fuse 52), the lead wires 53 and 54, the first electric power supply cable 60, the second electric power supply cable 63 and the connector 66 are disposed may be a parallel circuit rather than the series electric circuit EC. For example, as shown in FIG. 19, when a portion of the parallel circuit is branched off into two parts, the branched parts may be installed to oppose the section to be heated and the current limiting elements (for example, the fuses 52) may be installed at the branched parts.

The photographing device for a vehicle may also be applied to an automatic driving vehicle.

What is claimed is:

1. A photographing device for a vehicle, comprising:
   an imaging element disposed on an inner side of a window section, the window section being formed of a transparent material and mounted on the vehicle, the imaging element being configured to receive a photographing beam passing through a beam transmission section, and the beam transmission section being a portion of the window section;
   a heater including a heating wire, the heater forming a portion of an electric circuit connected to a power supply and configured to generate heat when power is supplied from the power supply;
   a heating section to which the heater is fixed, the heating section being disposed on an opposite side to an inner side surface of the beam transmission section with respect to the beam transmission section, the heating section being configured to receive the heat from the heater and apply radiant heat to the beam transmission section;
   a switch element forming a portion of the electric circuit, the switch element being configured to switch an electrical connection state of the heater; and
   a current limiting element disposed at the heating section and forming a portion of the electric circuit between the heater and the switch element, the current limiting element being configured such that current flowing through the heater is zero or is reduced when (i) the electric circuit is short-circuited such that power is supplied to the heater while bypassing the switch element, and (ii) a temperature transferred from the heating section to the current limiting element is equal to or higher than a predetermined value.

2. The photographing device for the vehicle according to claim 1, wherein one surface of the heating section is a plate-shaped body, and the current limiting element is disposed on a straight line extending in a plate thickness direction of the heating section and through a center of gravity of the heating section.

3. The photographing device for the vehicle according to claim 1, wherein the current limiting element is a fuse, a bi-metal or a PTC thermistor.

4. The photographing device for the vehicle according to claim 1, wherein the electric circuit is a series electric circuit.

5. The photographing device for the vehicle according to claim 1, further comprising:
   a heater fixing section configured to fix the heater to the heating section, a double sided tape having a first surface and a second surface, the first surface being adhered to the heater fixing section, and an heat insulating material adhered to the second surface of the double sided tape, the heat insulating material having a thermal conductivity lower than a thermal conductivity of the heater fixing section and the heating section, wherein one surface of the heating section is a plate-shaped body.

* * * * *